N. D. STURGES.
STORAGE BATTERY.
APPLICATION FILED JAN. 5, 1921.
1,415,275. Patented May 9, 1922.
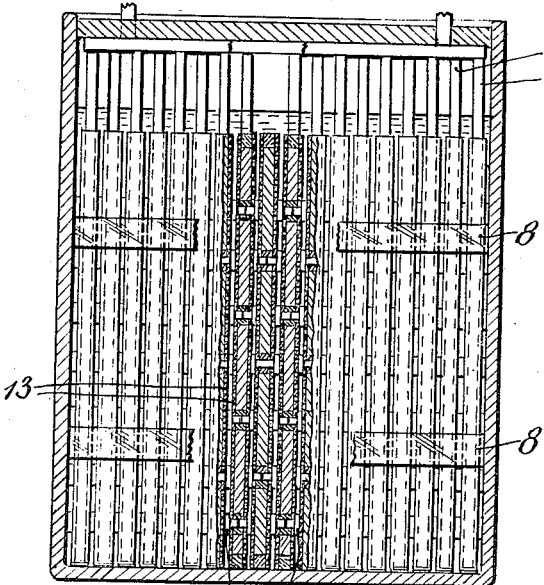
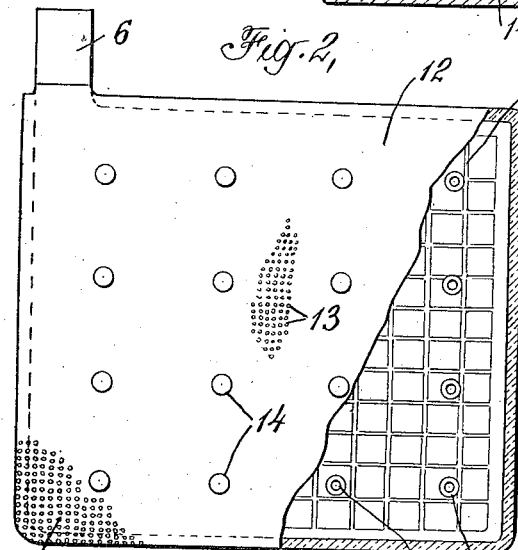
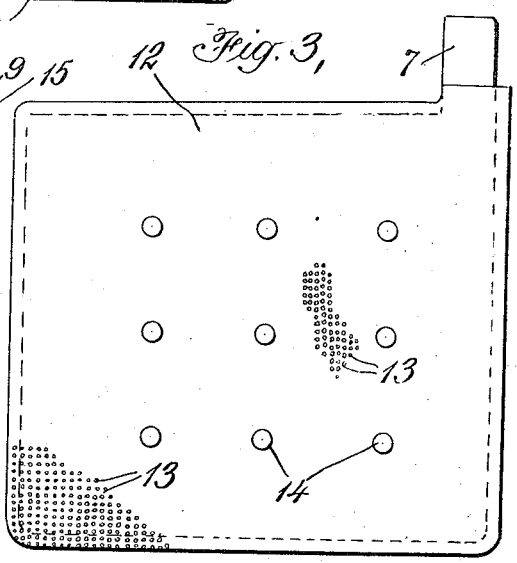
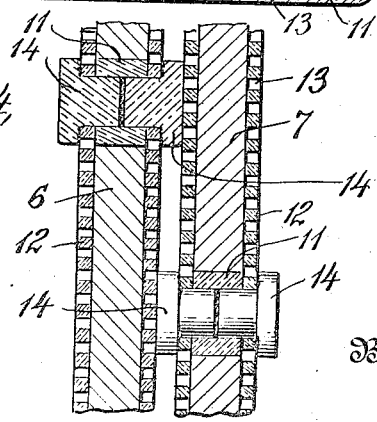
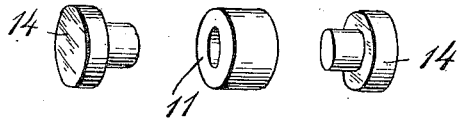
Inventor
Norman Dexter Sturges
By his Attorneys
Pennie Davis Marvin & Edmonds

UNITED STATES PATENT OFFICE.

NORMAN DEXTER STURGES, OF BELLEROSE, NEW YORK, ASSIGNOR, BY MESNE ASSIGNMENTS, TO MULTIPLE STORAGE BATTERY CORPORATION, A CORPORATION OF DELAWARE.

STORAGE BATTERY.

1,415,275.

Specification of Letters Patent. Patented May 9, 1922.

Application filed January 5, 1921. Serial No. 435,059.

*To all whom it may concern:*

Be it known that I, NORMAN DEXTER STURGES, a citizen of the United States, residing at Bellerose, in the county of Nassau, State of New York, have invented certain new and useful Improvements in Storage Batteries; and I do hereby declare the following to be a full, clear, and exact description of the invention, such as will enable others skilled in the art to which it appertains to make and use the same.

This invention relates to secondary or storage batteries of the lead-sulphuric acid type, and is directed more particularly to improvements whereby the tendency, which has been heretofore considered unavoidable, of the plates to disintegrate after repeated charging, is overcome and the life of the battery is greatly prolonged.

During an extended experience, including the careful study of substantially all types of lead-sulphuric acid storage batteries, I have observed that when the battery is charged, the pasted material on the plates is more tightly gripped in the supporting grid than when the battery is discharged. In other words, the pasted material expands and contracts materially during the charging and discharging operation. In a well designed grid, the variation mentioned may be within the elastic limit of the material, so that no fissure between the grid and the pasted material is formed for a considerable period, during which the battery operates at maximum efficiency. Eventually however, in all types of lead-sulphuric acid batteries, fissures begin to form and reduce the electrical contact between the pasted material and the grid. Under certain conditions, lead-sulphate may be deposited in the fissures, accentuating the resistance and acting as a wedge to prevent contact between the pasted oxide and the grid when the battery is fully charged. Whenever fissures commence to form, the deterioration of the battery begins, the active material falls away, and the efficient life of the battery is not thereafter greatly prolonged.

The phenomenon described has stimulated various attempts to prevent the formation of fissures, but without material success either because the expedients suggested offered no real advantage, or were of such a character as to preclude commercial exploitation of the battery. There has, therefore, been no practicable solution of the problem, and storage battery manufacturers have come to regard deterioration of batteries in the manner described as an inherent defect which could not be overcome.

It is the object of the invention to provide a method of and means for preventing the formation of fissures between the pasted material and the grid, with the resulting advantage of prolonging the life of the battery.

Further objects and advantages of the invention will be apparent as it is better understood by reference to the following specification and accompanying drawing, in which the preferred embodiment of the invention is illustrated. It is to be understood, however, that the principles of the invention may be applied in various ways, and that no attempt has been made to illustrate all of the specific applications which will readily occur to those skilled in the art.

In the drawing, Fig. 1 is a vertical section through a battery embodying the invention.

Fig. 2 is a view in elevation of a plate with a portion of the facing broken away.

Fig. 3 is a view in elevation of a complementary plate, illustrating a different arrangement of the rivets.

Fig. 4 is an enlarged section through a pair of plates, and

Fig. 5 is a detail in perspective of the rivets.

As the result of extended experimental work, I have learned that the tendency to form fissures between the pasted material and the grid may be entirely obviated by the continuous application of pressure through suitable agencies, preferably facings, to relatively restricted areas or subdivisions of the active material on the plates. As the plates expand and contract under charging and gradual thickening, the means employed for applying pressure thereto must be capable of stretching somewhat and without taking a permanent set. It must, therefore, be elastic within certain limits and also unaffected by the sulphuric acid electrolyte. The facings are particularly useful in connection with the positive plates, which are disintegrated most rapidly when unprotected. Because of the extended life and increased efficiency of batteries embodying the invention, it is desirable to protect the negative plate from erosion, a result which is best accomplished by similarly applying pressure to the faces thereof.

I have discovered that celluloid is well adapted for the purposes of the invention, since it has the requisite degree of elasticity and is impervious to the acid. Rubber and other materials of a similar character, while not so advantageous, may be substituted and are to be considered within the scope of the invention. In carrying out the invention, perforated facings, preferably of celluloid, are applied to the opposite sides of the plates and are held in a suitable manner, so as to constantly apply sufficient pressure over relatively restricted areas or subdivisions to the pasted material, thereby obviating any possibility of the formation of fissures. The facings may be cemented, riveted or otherwise fastened to the grid, but are preferably secured in a manner analogous to the "tufting" of a mattress by connecting the opposite facings through the grid. The spacing of the "tufting" is such with respect to the stiffness of the perforated celluloid facings, that the desired pressure is always exerted on the pasted material. As the plate thickens gradually, the fields between the "tufting" are distended, thus increasing the pressure on the pasted material, and preventing the inception of fissures. The elasticity of the celluloid permits such distension and the continued application of pressure which is essential to the accomplishment of the desired object.

The increased life of the battery resulting from the application of the invention, makes it desirable to minimize surface erosion, a factor to which little attention has been paid heretofore, because disintegration ended the effective life of the battery before erosion was noticeable. Consequently, the perforations in the facings are preferably as small as $\frac{1}{32}$ of an inch and are spaced about twenty to the linear inch. The facings, when of celluloid, may be relatively thin and the tufting is preferably rather closely spaced. The facings prevent disintegration and batteries constructed as described have been in use for the purpose of testing the invention for a period which would insure the presence of sludge in an ordinary battery, but no sludge has appeared. On breaking a plate thus tested, the pasted material has been found to be still in excellent electrical contact with the grid.

As a further modification and to reduce the cost of construction, the necessity of close tufting or locking of the facings may be overcome by providing projections or pegs on or through the plates which, when the battery is assembled, will bear against the fields between the "tufting." The application of pressure in this manner to the plates may be accomplished by forcing the whole pack of plates into a sufficiently strong and tight-fitting battery jar, or by tight and strong clasping bands, preferably of celluloid as illustrated and described in Letters Patent No. 1340636, granted to me on March 30, 1920. If the strength of cell is depended upon to provide the necessary resistance when the pack of plates is forced therein to apply pressure to the plates, I prefer to employ a container of celluloid or rubber, which is elastic enough to ensure against cracking. These containers may be held singly or in groups in a strong unyielding wooden case in which the containers tightly fit.

While the facings may with advantage be applied only to the positive plates, the increased life of the battery, resulting from the application of the present invention, is such as to warrant protection of the negative plate from erosion, a factor which is ordinarily of slight importance, because of the early deterioration of the positive plate resulting from the formation of fissures. Preferably, therefore, the negative plate is provided with facings of celluloid or similar and suitable material. These facings are similar to those previously described, and are secured in the same manner to the plate to apply pressure to relatively restricted areas or subdivisions thereof. The fastening devices may advantageously serve the purpose of the projections or pegs on the negative plates as previously described, and, by engaging the fields on the positive plates between the tufting, ensure continuous application of pressure thereto. Similarly, the fastening devices on the positive plates may engage the fields between the tufting on the negative plates.

Referring to the drawing, 5 indicates a suitable battery jar adapted to receive a group of positive and negative plates 6 and 7 respectively, and to contain the necessary electrolyte. The jar may be of celluloid, hard rubber or other suitable material, having the requisite strength and elasticity to withstand the pressure exerted by the plates during expansion. The plates need not, however, entirely fill the battery jar, in which event, bands 8, of celluloid or other suitable material, may be disposed about the plates to maintain them in assembled relation and to exert the necessary resistance to expansion. These bands may be used even when the plates are intended to substantially fill the battery jar. It will be particularly noted that, owing to the character of the plates and the prevention of scaling and consequent accumulation of sludge, it is unnecessary to provide ridges in the bottom of the jar as is customary in storage batteries. Of course, such ridges may be provided, as where the plates are mounted in battery jars of the hitherto common type.

The plates comprise grids 9, in which the pasted material is formed in the usual manner. Extending through the pasted material at intervals are a plurality of bushings 11, preferably of celluloid. The opposite faces of the plates are covered by sheets 12 of celluloid, provided with perforations 13, to permit the passage of the electrolyte to the active material. The facings are held in place by rivets 14, which are disposed through the bushings 11, and held therein by the use of a suitable cement. Such a cement may be a celluloid composition which, when it hardens, joins the rivets and the bushings in a substantially unitary structure. These rivets hold the celluloid facings in close contact with the faces of the plates. The lateral edges of the plate are preferably covered by strips of celluloid 15, securely cemented to the facings. Thus, the plates are entirely enclosed in envelopes of celluloid which, however, permit circulation of the electrolyte by reason of the perforations in the facings. The facings are held in contact with the faces of the plates in a manner similar to tufting, and a plurality of fields are thus provided on the faces of the plates, which, when the pasted material expands, results in the application of pressure and prevents disintegration.

To insure the application of such pressure, the rivets in the positive and negative plates are staggered or arranged in such a manner that, as the plates are assembled, the rivets engage approximately the centers of the tufted fields. No other separators are required, and, when the plates are assembled in the battery jar or held by means of celluloid or other bands, expansion of the active material results in securely holding the facings against the plates, at the same time, increasing the number of points at which the pressure is applied. Thus, for example, in plates having a superficial area of 25 square inches at each face, a sufficient number of rivets may be employed to insure the application of pressure to each square inch of the plate surface.

The result is the entire elimination of scaling, erosion or other disintegration of the plates during charging and discharging thereof. The active material is held at all times in good electrical contact with the grids, and cannot become loosened under any circumstances. The short circuiting, which frequently results from accumulation of sludge in the battery, is entirely obviated and the plates can, under no condition, touch each other and thus cause a short circuit, as in batteries provided with wooden separators and unprotected plates.

As will be readily understood, the successful accomplishment of the object specified, depends upon the application of elastic pressure to the relatively restricted areas or subdivisions of the faces of the positive plates, so that all of the pasted material is subjected continuously to such pressure and is thereby held in close electrical contact with the grid. Obviously the physical embodiments of the invention may be varied as well as the materials employed.

As a result of this improvement herein described, storage batteries may have an almost unlimited life so far as the disintegrating tendency of normal use is concerned. The increased life of the battery makes it at once more economical both in the first cost and in the saving resulting from an extended period during which the battery operates at maximum efficiency. The necessity for frequent renewal of batteries has limited their availability for many uses to which they may be successfully adapted when constructed in accordance with the present invention and having the advantages of such construction.

The area of the active material referred to in the claims hereafter is the area included between the outer edge members of the battery grid which comprise the frame thereof.

Various changes may be made in details of arrangement and other essentials of the invention within the scope of the accompanying claims, without sacrificing any of the superiority which results from its application.

I claim:

1. A method of preventing disintegration of the plates of electric storage batteries of the lead-sulphuric acid type, which comprises subjecting the active material on the opposite faces of the plates to pressure of a flexible non-conducting medium contacting therewith and rigidly connected at a plurality of points through the faces of the plates whereby the effective pressure is applied to a plurality of relatively restricted areas of the active material.

2. A storage battery element comprising a grid, active material pasted thereon and thin perforated facings of non-conducting flexible material rigidly connected through the grid at intervals throughout the area of the active material and snugly contacting with the pasted material.

3. A storage battery element comprising a grid, active material pasted thereon, perforated facings of non-conducting flexible material applied to opposite sides of the element, and connectors extending through the element at intervals throughout the area of the active material and rigidly securing the facings in snugly contacting relation to the active material.

4. A storage battery element comprising a grid, active material pasted thereon, insulating bushings embedded in the active material, thin perforated facings of non-conducting flexible material contacting with the surfaces of the active material, and insulating rivets disposed through the bushings and engaging the perforated facings to rigidly hold the latter in contact with the active material.

5. A storage battery element comprising a grid, active material pasted thereon, thin perforated facings of non-conducting flexible material rigidly connected through the grid at intervals throughout the area of the element and snugly contacting with the pasted material, and strips of non-conducting material surrounding the edges only of the grid and permanently attached to the facings.

6. A storage battery including positive and negative elements having perforated facings of non-conducting flexible material, connectors extending through the elements to rigidly secure the facings in snugly engaging relation to the surfaces thereof, the connectors on the respective elements being adapted to engage the oppositely disposed facings, and means for holding the elements in assembled relation.

7. A storage battery including positive and negative elements having perforated facings of non-conducting flexible material connected through the elements and snugly engaging the surfaces thereof, protuberances of non-conducting material on the respective elements arranged in staggered relation and adapted to engage the facings on the oppositely disposed elements, and means for holding the elements, in assembled relation, including a container of sufficient strength to resist the outward thrust of the assembled elements when the latter are tightly forced therein.

8. A storage battery including positive and negative elements having perforated facings of non-conducting flexible material rigidly connected through the elements and snugly engaging the surfaces thereof, protuberances on the respective elements engaging the facings on the oppositely disposed elements in substantially the centers of the fields between the opposing protuberances, and means for holding the elements in assembled relation.

In testimony whereof I affix my signature.

NORMAN DEXTER STURGES.